United States Patent [19]
Keller

[11] Patent Number: 6,109,828
[45] Date of Patent: Aug. 29, 2000

[54] HORIZONTAL DRILLING METHOD

[76] Inventor: Carl E. Keller, P.O. Box 9827, Santa Fe, N. Mex. 87504

[21] Appl. No.: 09/166,786

[22] Filed: Oct. 5, 1998

Related U.S. Application Data

[62] Division of application No. 08/841,894, Apr. 17, 1997, Pat. No. 5,816,345.

[51] Int. Cl.[7] .................................. E03F 3/06; F16L 3/08; F16L 3/18
[52] U.S. Cl. .............................. 405/146; 175/53; 175/62; 405/150.1; 405/184
[58] Field of Search ..................................... 405/128, 129, 405/146, 150.1, 151, 154, 156, 184; 175/53, 314, 62; 138/97, 140; 264/516

[56] References Cited

U.S. PATENT DOCUMENTS

| | | | |
|---|---|---|---|
| 2,927,775 | 3/1960 | Hildebrandt | 175/226 |
| 4,064,211 | 12/1977 | Wood | 264/516 |
| 4,522,125 | 6/1985 | Marz | 102/313 |
| 4,680,066 | 7/1987 | Wood | 156/156 |
| 4,770,562 | 9/1988 | Muller | 405/154 |
| 4,980,116 | 12/1990 | Driver | 264/516 |
| 5,169,264 | 12/1992 | Kimura | 405/184 |
| 5,176,207 | 1/1993 | Keller | 166/64 |
| 5,186,987 | 2/1993 | Imoto et al. | 428/34.5 |
| 5,377,754 | 1/1995 | Keller | 166/264 |
| 5,466,093 | 11/1995 | Keller | 405/152 |
| 5,494,118 | 2/1996 | Wood | 175/22 |
| 5,546,992 | 8/1996 | Chick et al. | 138/98 |
| 5,743,299 | 4/1998 | Chick et al. | 138/98 |
| 5,778,938 | 7/1998 | Chick et al. | 138/98 |
| 5,803,666 | 9/1998 | Keller | 405/146 |
| 5,853,049 | 12/1998 | Keller | 166/380 |
| 5,971,029 | 10/1999 | Smith et al. | 138/98 |

*Primary Examiner*—Eileen Dunn Lillis
*Assistant Examiner*—Tara L. Mayo

[57] ABSTRACT

A bore hole support system is formed from a flexible liner that is readily everted within a bore hole and forms a bore hole support system to install a casing in the bore hole while supporting the bore hole walls. After a pilot hole is drilled, the pilot hole is traversed with a reamer to form the pilot hole diameter to a larger diameter for the final bore hole. The flexible liner with the attached casing is everted and pressurized behind the reamer as the reamer traverses the pilot hole to support walls defining the bore hole while pulling the casing into the bore hole. The liner is simply removed from a storage and everting canister and remains with the casing in the bore hole. In certain circumstances, the liner may be coated with a water soluble material so that the casing may be in fluid communication with the bore hole walls when the coating has dissolved.

1 Claim, 4 Drawing Sheets

HORIZONTAL DRILLING METHOD

This is a Divisional of application Ser. No. 08/841,894, filed Apr. 17, 1997, now U.S. Pat. No. 5,816,345.

BACKGROUND OF THE INVENTION

This invention relates to drilling horizontal bore holes, and, more particularly, to stabilizing horizontal borehole walls.

Many uses arise for horizontal bore holes, particularly in the field of environmental remediation where a geologic structure must be followed for contaminant monitoring and removal. There are several considerations relative to drilling horizontal boreholes. A first consideration is forming the borehole itself, i.e., drilling the passage through the earth. A second consideration is the support of the bore hole walls. Next, as the hole is drilled, the bore hole cuttings must be removed from the borehole. The final consideration is the installation of a casing and, optionally, a well screen within the borehole.

In conventional drilling, a drilling mud is circulated around a drill bit in order to flush the cuttings from the drill from the hole. The drilling mud is commonly formed of a composition that will form a mud cake on the borehole wall and support the borehole walls against collapse. Drilling mud exerts pressure against the hole wall, which then supports the wall. If the drilling mud cannot support the hole wall, the walls will collapse and greatly impede emplacement of the casing and any well screen provided with the casing.

In drilling horizontal holes for remediation of contaminated geologic formations, however, the drilling mud acts to plug the pore space of the formation. The plugging effect of the drilling mud drastically reduces the permeability of the geologic formation to fluid flow into or out of the hole. The plugging effect is especially pronounced in loosely consolidated sands and gravel that are often the preferred flow paths of contaminates in the geologic structure.

It will also be-appreciated that the drilling muds that effectively support the borehole walls also circulate very slowly in large diameter bore holes. This slow circulation velocity reduces the effectiveness of the drilling mud to remove the drill cuttings from the borehole.

Patent application Ser. No. 08/769,656, now U.S. Pat. No. 5,803,666, "Horizontal Drilling Method and Apparatus," filed Dec. 19, 1996, incorporated herein by reference, describes a liner system that supports a bore hole and reduces friction during casing installation in a bore hole. The liner system is designed to be removed from about the casing after casing installation so that the casing and any screens thereon can directly contact the bore hole walls for communication with the surrounding structure. But, in many instances, there is no need to communicate with the geologic structure and no need for the complications associated with liner removal from about an installed casing.

Accordingly, it is an object of the present invention to provide an alternate means for supporting the wall of a borehole during horizontal drilling.

It is another object of the present invention to avoid the buildup of mud cake on the bore hole wall and improve the removal of cuttings out of the borehole.

Yet another object of the present invention is to provide a simple liner system for use in casing installation in a borehole.

One other object of the present invention is to reduce the forces on the hole casing during emplacement in the borehole.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

To achieve the foregoing and other objects, and in accordance with the purposes of the present invention, as embodied and broadly described herein, the apparatus of this invention may comprise a bore hole support system. A bore hole casing is provided with first and second ends. A flexible liner defines a generally cylindrical shape with an interior and an exterior when everted and has a distal end connected to the first end of the casing and a proximal end. A canister for housing the liner and the casing in an inverted condition defines an exit end connected to the proximal end of the liner. A first cord is connected to the second end of the casing and extends through the canister for inverting the liner with the casing. A second cord is connected to the first end of the casing and extends along the exterior of the liner to the canister for everting the liner with the casing.

BRIEF DESCRIPTION OF THE DRAWINGS

The accompanying drawings, which are incorporated in and form a part of the specification, illustrate the embodiments of the present invention and, together with the description, serve to explain the principles of the invention. In the drawings.

DETAILED DESCRIPTION OF THE INVENTION

Figure 1:
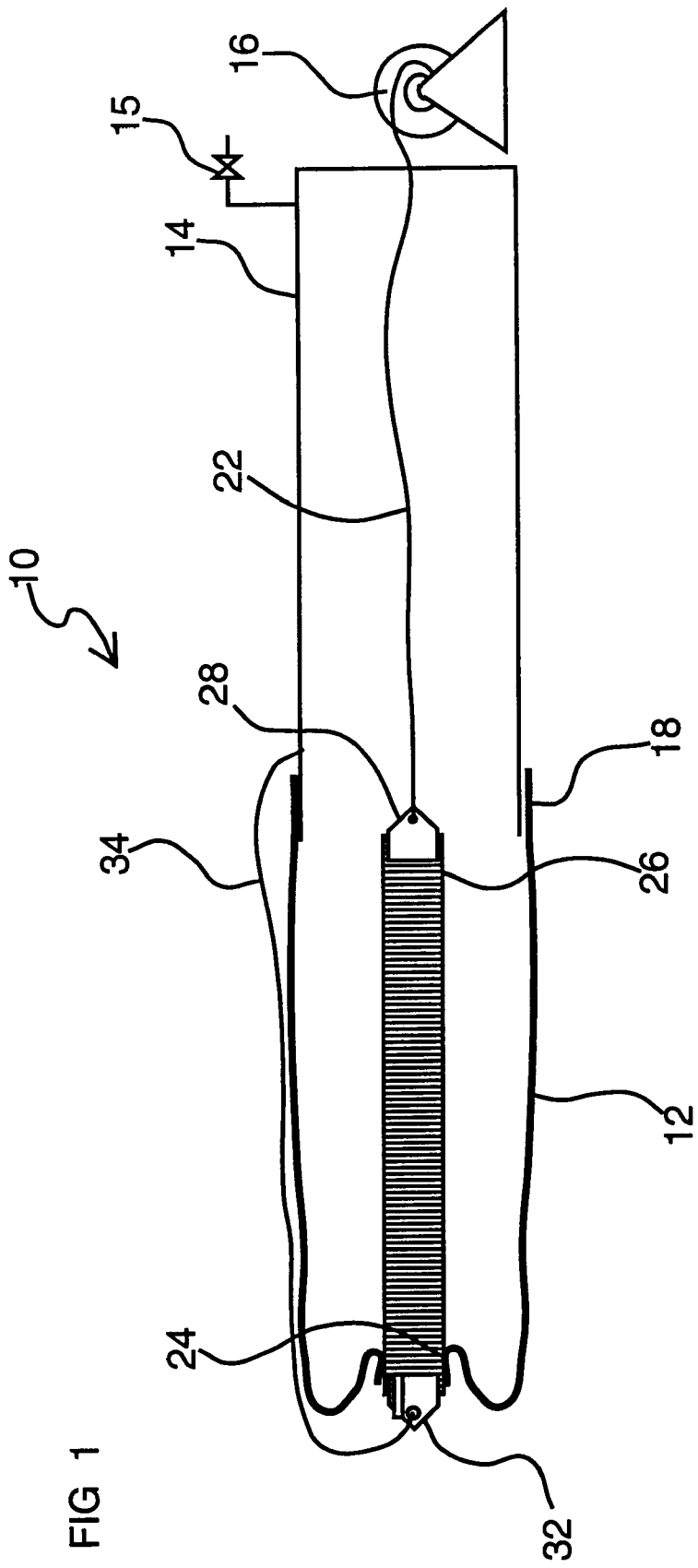
FIG. 1 is a pictorial illustration in cross-section of an everting bore hole liner for placement with a borehole casing according to one embodiment of the present invention.

In accordance with the present invention, the bore hole wall support function of drilling mud is replaced with an everting flexible borehole liner. As shown in FIG. 1, a suitable flexible bore hole liner system 10 is formed from a flexible liner 12 with its distal end 24 attached to casing 26 by a suitable clamp, or the like. Inversion tether 22 is attached to an enclosing reel 16. Proximal end 18 of flexible liner 12 is attached to canister 14 by a clamp, or the like. It will be understood that the various components may be connected by simple circular clamps or sleeves, but any convenient means of attachment may be used.

In the special case when the removal of the liner is not required (e.g., there is no screen in the casing), the casing can be installed directly during liner eversion. Liner 12 is attached directly to a first end of casing 26. Casing 26 is plugged at the first end with tapered plug 32. Tether 22 is attached to second tapered plug 28. Tapered plugs 28, 32 allow casing 26 to move more easily in canister 14 and liner 12. Plugs 28, 32 are preferably equipped with ports to allow the casing to be filled with water, if needed, in order to achieve near-neutral buoyancy for less friction during eversion from canister 14. Liner 12 is everted from canister 14 to carry casing 26 into the borehole as described for FIGS. 2 and 4.

In an exemplary embodiment, flexible liner 12 and casing 26 are inverted within canister 14 by winding cord-like member 22 onto reel 16. Everting liner systems are well known and are not, per se, the subject of the present invention. Everting liner systems are shown in U.S. Pat. No. 5,176,207, issued Jan. 5, 1993; U.S. Pat. No. 5,377,754, issued Jan. 3, 1995; and U.S. Pat. No. 5,466,093, issued Nov. 14, 1995, all incorporated herein by reference.

Figure 2:
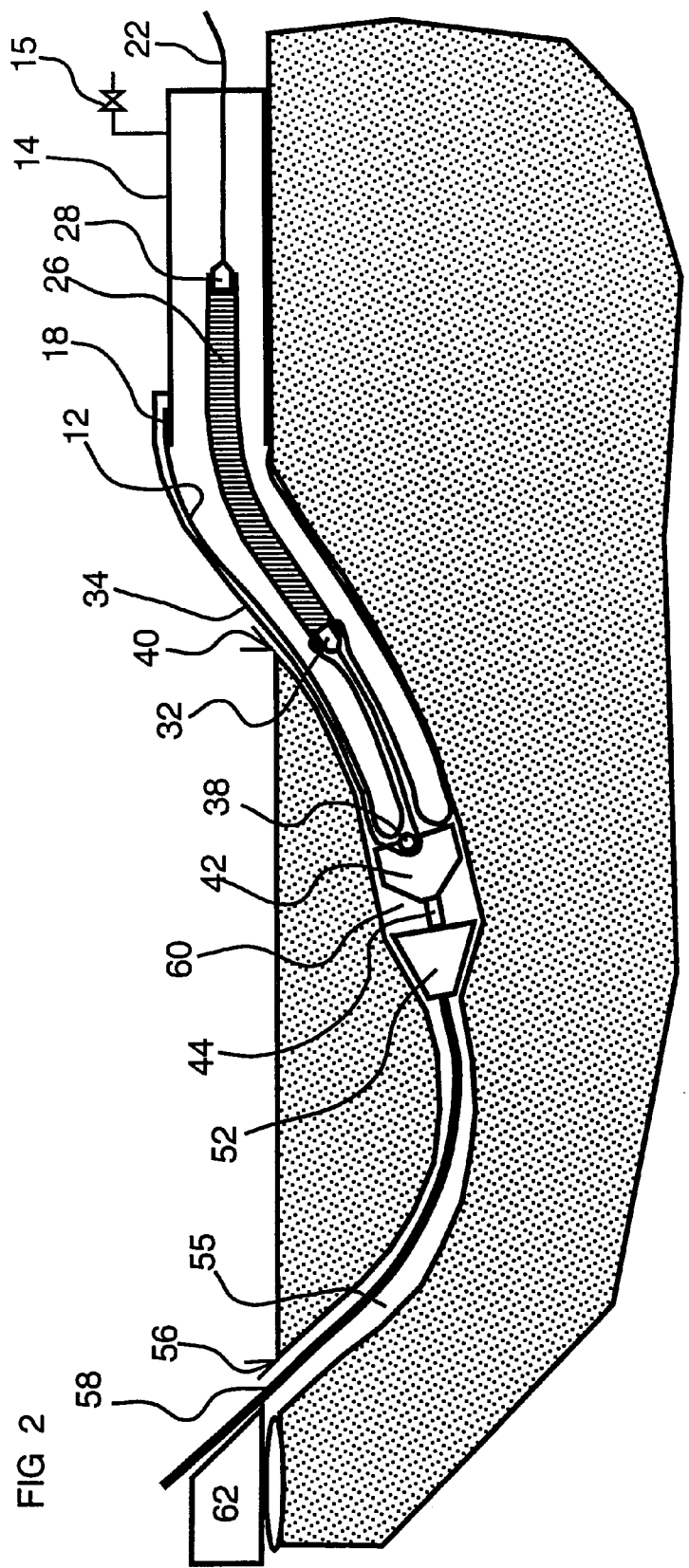
FIG. 2 is an illustration in cross-section of a system for forming a final bore hole using an everting liner.

In accordance with one aspect of the present invention, as shown in FIGS. 1 and 2, a second cord-like member 34 is fixed to plug 32 in casing 26 and passes about the exterior of liner 12 to proximal end 18 of liner 12. As shown in FIG. 1, the proximal end of cord 34 is fixed to canister 14. Cord 34 can now be pulled to assist in everting liner 12 from canister 14. Liner 12 is inflated by introducing a fluid, e.g., water, through valve 15.

In a particular application, described below, a generally rigid member 42, hereinafter called a "pig", includes an attachment point 38, which may be a bolt eyelet, pulley, or the like, through which cord 34 passes to assist in everting liner 12 and casing 26. As pig 42 is moved through a bore hole, as hereinafter explained, attachment 38 pulls cord 34 as cord 34 slides through attachment 38 and everts liner 12 and casing 26 from canister 14. Pig 42 is generally a conical/cylindrical shape and further includes a second attachment point 44 for attaching to a drill string component.

Figure 3:
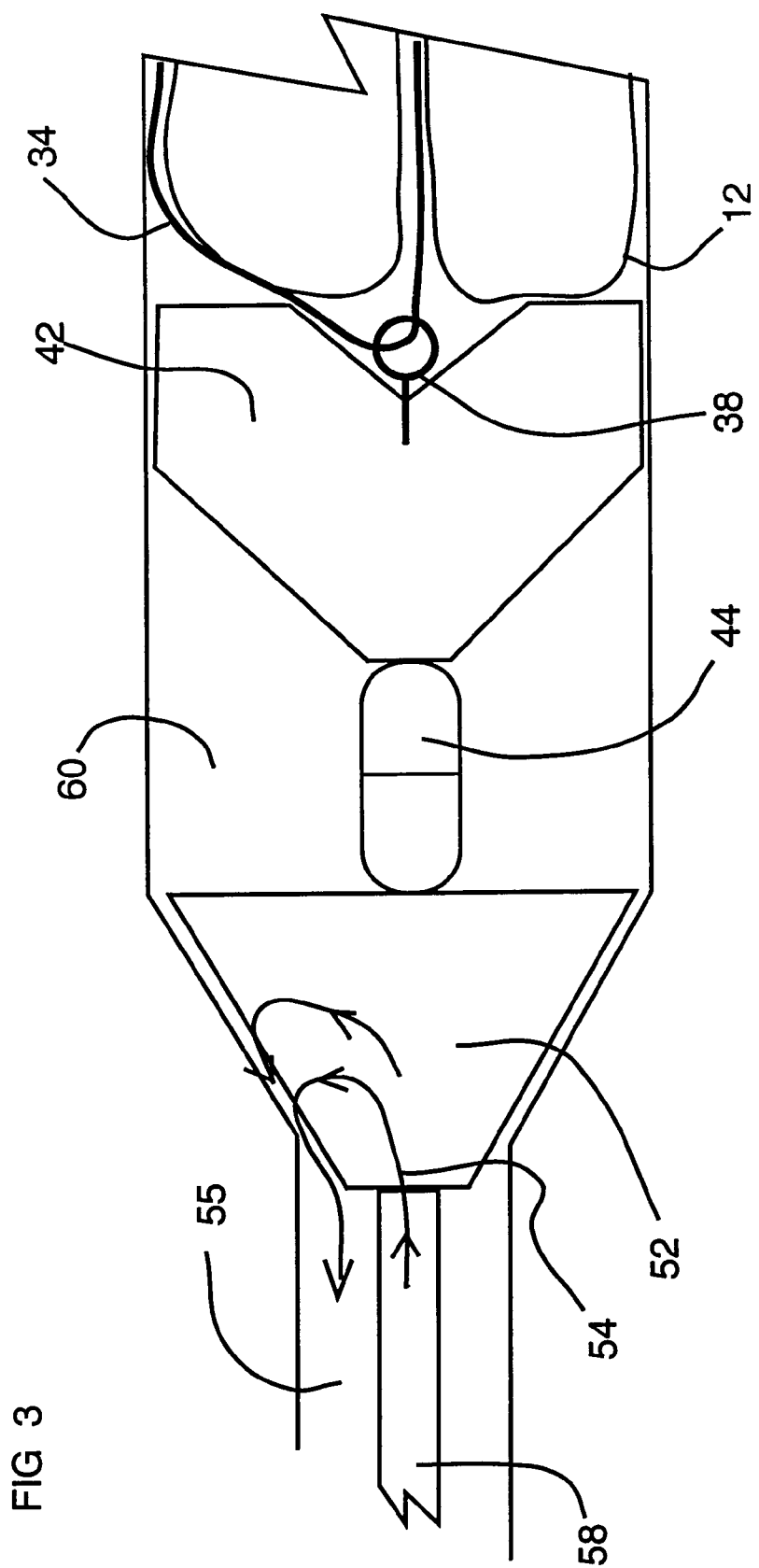
FIG. 3 is a pictorial illustration in cross-section of a drill reamer, and everting bore hole liner for use in casing installation.

FIGS. 2 and 3 further illustrate the installation of flexible liner 12 within a borehole. Pilot hole 55 is formed conventionally with entrance end 56 and exit end 40. Pilot hole 55 is typically small (2-5 inches in diameter) and is formed by driving a steerable bit (not shown) through the earth to exit end 40. Drilling fluids are injected through the bit to support the wall of pilot hole 55 and to remove drill cuttings from the hole as the cuttings are generated.

When pilot hole 55 is completed, drill stem 58 extends through end 40 and reaming drill bit 52 is attached to the end of drill stem 58. In accordance with one aspect of the present invention, pig 42 is attached to reamer 52 by connection 44, which is preferably a rotatable connection so that pig 42 does not rotate as reamer 52 is rotated to form a bore hole to the desired final diameter. Drill stem 58 is rotated by drill rig 62 and pulled back through pilot hole 55 as reamer 52 is rotated and drawn through pilot hole 55. Thus, reamer 52 draws pig 42 through enlarged hole 60, which, in turn, pulls cord 34 and everts liner 12 and casing 26 into enlarged bore hole 60.

Liner 12 may be pressurized by a fluid, e.g., water, introduced through valve 15 to maintain the advancing end of liner 12 in contact with pig 42 as reamer 52 reams out pilot hole 55. Pressurized everting liner 12 supports and seals the wall of bore hole 60 formed by reamer 52. The pressure in liner 12 is controlled to be greater than the pressure of drilling fluid that is circulating around reamer 42. Thus, the flow of drilling fluid in pilot hole 55 is forced to flow along the pilot hole surrounding drill stem 58 and can be maintained at a relatively high flow rate to remove cuttings generated by reamer 52 through hole entrance 56. Further, with liner 12 inflated within enlarged bore hole 60, the drilling fluid does not flow into the enlarged hole and cannot form a mud cake on the wall of the enlarged final hole.

The everting, inflated liner 12 supports the wall of the enlarged bore hole 60, prevents mud cake formation on the enlarged hole wall 60, reduces the drilling fluid injection into the medium outside enlarged hole 60, improves cutting removal via pilot hole 55 and also prevents cuttings from settling out of the drilling fluid, which would otherwise flow more slowly in the enlarged bore hole.

As further shown in FIG. 2, casing 26 is removed from within canister 14 as liner 12 is everted within borehole 60. Liner 12 supports the walls of bore hole 60 as casing 26 moves through bore hole 60 to prevent collapse of the bore hole walls onto casing 26 and to form a relatively low friction surface along which casing 26 moves.

Figure 4:
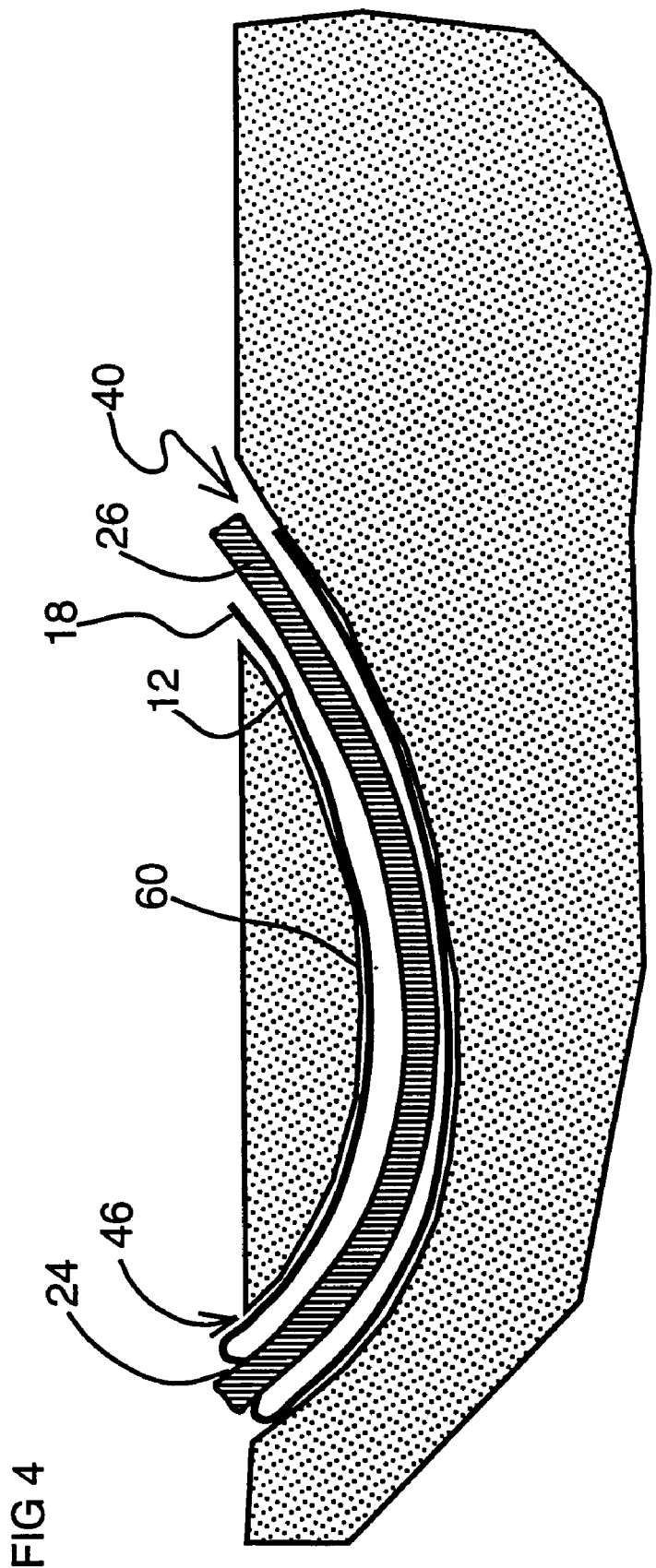
FIG. 4 is a pictorial illustration of the completed bore hole supported by an everted liner and the installed casing.

FIG. 4 is a pictorial illustration of casing 26 fully installed in bore hole 60. The ends of casing 26 extend through entrance end 46 and exit end 40 of bore hole 60. Distal end 24 of liner 12 is at entrance end 46 and proximal end 18 is at exit end 40 of bore hole 60. Proximal end 18 has been disconnected from canister 14 (FIG. 1) and liner 12 remains within borehole 60.

As noted above, liner 12 is pressurized by a working fluid to evert liner 12 and casing 26 from canister 14. Thus, liner 12 is generally formed of an impermeable material during casing 26 installation. Typical materials include urethane, polyvinyl, coated nylon, fiberglass, and Kevlar, or a coated porous fabric, e.g., felt, flannel, or muslin, coated with, e.g., urethane, polyvinyl chloride, teflon, or the like. In some instances, a casing is provided with screens so the interior of the casing can communicate with the surrounding geologic structure.

In a particular aspect of the present invention, liner 12 is formed of a coated porous fabric, where the coating dissolves in water. A suitable exemplary coating is polyvinyl alcohol. Then, liner 12 is inflatable for the initial eversion and casing installation, but forms a water permeable structure when the coating dissolves.

The foregoing description of the preferred embodiments of the invention have been presented for purposes of illustration and description. It is not intended to be exhaustive or to limit the invention to the precise form disclosed, and obviously many modifications and variations are possible in light of the above teaching. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A method for encasing a horizontal bore hole, comprising the steps of:

providing an everting liner system with an attached casing at an exit location from a pilot hole having an exit end and an entrance end;

locating a reamer at the exit end of the pilot hole; and traversing the pilot hole from the exit end to the entrance end with a reamer to form the pilot hole to a diameter for the bore hole while everting and pressurizing the liner system behind the reamer as the reamer traverses the pilot hole to support walls defining the bore hole with a flexible liner while pulling the casing into the bore hole.

* * * * *